April 28, 1953     K. R. MORE ET AL     2,636,383
WELL BORE MEASURING AND FLUID METERING DEVICE
Filed Jan. 23, 1948
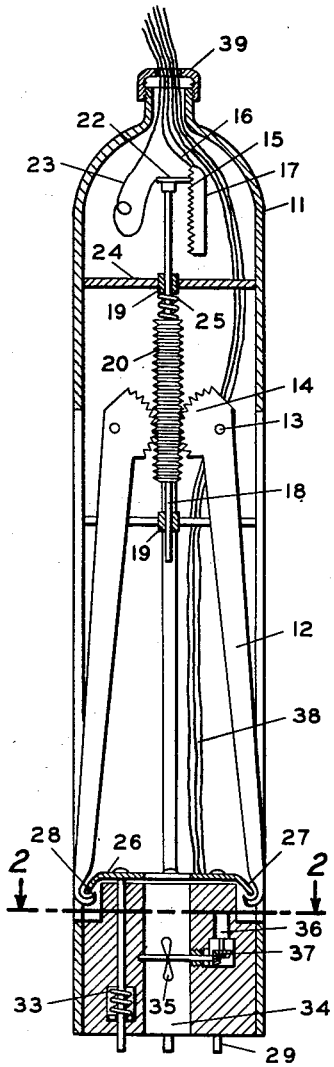
FIG. 1
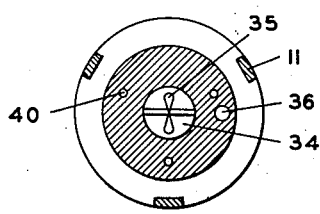
FIG. 2
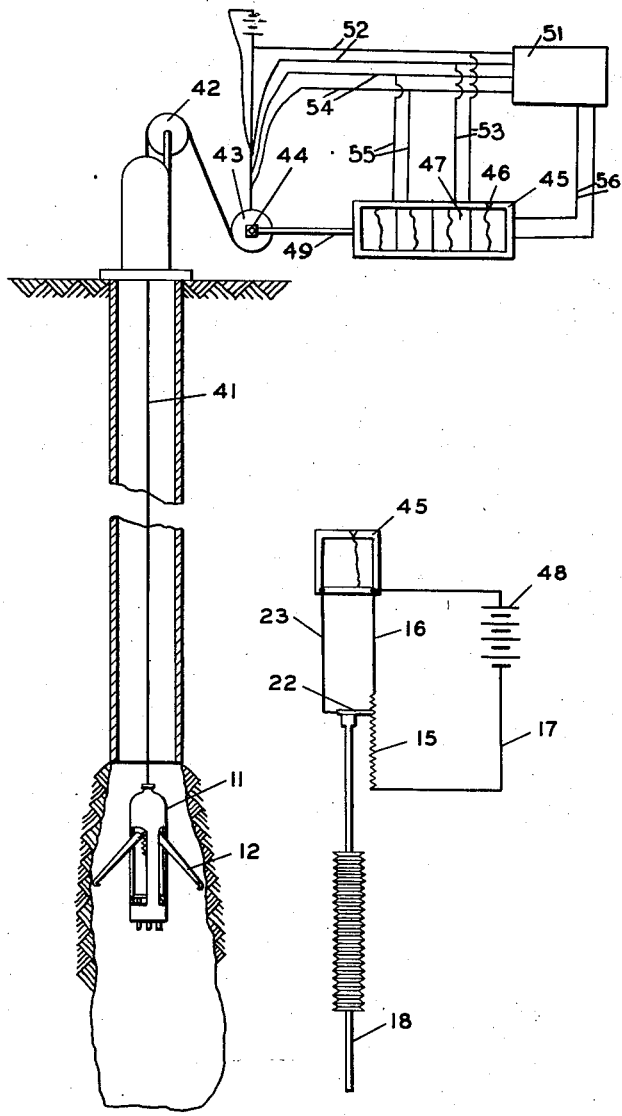
FIG. 3
FIG. 4
INVENTOR.
K. R. MORE
W. G. MIDDLETON, JR.
BY Hudson and Young
ATTORNEYS Patented Apr. 28, 1953

2,636,383

UNITED STATES PATENT OFFICE 2,636,383

WELL BORE MEASURING AND FLUID METERING DEVICE

Kenneth R. More, Vancouver, British Columbia, Canada, and Walter G. Middleton, Jr., Bartlesville, Okla., assignors to Phillips Petroleum Company, a corporation of Delaware Application January 23, 1948, Serial No. 3,906

5 Claims. (Cl. 73—155)

This invention relates to the exploration of wells. In one of its more specific aspects it relates to means for determining the size of passages, including well bores. In another of its specific aspects it relates to means for measuring fluid flow through various types of passages, including well bores and the like, while measuring the diameter of said passage in a substantially adjacent plane.

It is frequently of interest to persons controlling the production of hydrocarbons to know the velocity of fluid flow at various depths throughout the length of a well bore of a hydrocarbon oil or gas well. A hydrocarbon bearing formation is generally not productive throughout its entire thickness and the various productive zones in such well bores commonly differ in their fluid productive capacities. Knowledge of productive conditions throughout the length of the well bore will enable the operator to more efficiently operate his wells and conserve the natural reservoir energy in the formations penetrated. Such information will be helpful to the operator not only in drilling operations but also in pressure maintenance and secondary recovery operations. In pressure maintenance and secondary recovery operations it is important that the rate of fluid flow from the various formations be known to the operator for it is generally in the highest producing formation that he will especially attempt to maintain pressure or increase recovery.

In the past, measurements of the rate of fluid flow in a bore hole have been made at one time and at a different time a measuring apparatus has been run in the bore hole to determine the diameter of the bore hole at various depths. It is obvious that the true rate of fluid flow may be determined only when the cross-sectional area of the hole through which the fluid passes is known. The conventional method of running separate measurements of the rate of fluid flow and well bore diameter are subject to considerable inaccuracy. A conventionally used flow measuring device is small enough in diameter that it has substantially no resistance to its passage through the well bore. It is also comparatively light in weight when compared to the flexible line from which it is suspended. For that reason it tends to float at the end of such a flexible line. Having little weight depending therefrom the flexible line tends to kink somewhat and in a reasonably deep well, the depth at which the meter rides will generally not correspond with the length of line paid out. On the other hand as the diameter meter passes upwardly along the length of the bore hole the projections therefrom which contact the sides of the well bore place a definite drag on the flexible line tending to stretch it to its full length, thus giving a more correct depth measurement. It will therefore be seen that measurements which were supposedly taken on the same depth may actually have been taken at two different levels.

An object of the invention is to provide an improved means for indicating and recording passage diameter and rate of fluid flow therethrough. Another object is to provide an improved method for indicating and recording passage diameter and rate of fluid flow therethrough. Another object is to provide improved means for locating the productive zones of a hydrocarbon bearing formation. Another object is to provide improved means for determining the rate of fluid flow from a well bore to a formation. Other and further objects and advantages will be apparent to those skilled in the art upon reference to the accompanying discussion, drawings and the claims.

A more complete understanding of the invention will be obtained upon reference to the accompanying drawings, in which Figure 1 is a diagrammatic vertical sectional view of a measuring device embodying a preferred form of the invention. Figure 2 is a horizontal cross-section taken along the line 2—2 of Figure 1. Figure 3 is a schematic drawing showing the relation between the diameter and fluid flow measuring device, the well bore, the depth measuring device and the recording means. Figure 4 is a diagrammatic sketch showing the relation between the diameter recorder and the variable resistance control.

In the device of Figure 1, shell 11 forms a case through the sides of which caliper contact means, such as a plurality of caliper arms 12, may be extended and form caliper contacts at their extended ends. Caliper arms 12 are preferably pivoted within shell 11 at points 13 intermediate their ends. The non-extendable ends of caliper arms 12 are provided with traction means; such as semi-circular gear toothed segments 14. Electrical resistance means, such as coil 15, is provided within shell 11 and completes the electrical circuit between lines 16 and 17. Slide member 18 is mounted in bearing means 19 within shell 11 and is disposed substantially coaxially therein. Slide member 18 is provided with a toothed section 20, the teeth of which section mesh with the teeth of sections 14 of caliper arms 12. Slide member 18 is provided with an electrical contact 22 which completes a circuit between line 16, coil 15, and electrical line 23. The upper portion of shell 11, which contains resistance coil 15 and contact 22 is sealed from liquid through which the device will pass by closure member 24. Suitable packing material may be provided in bearing 19 in closure member 24 so as to prevent leakage of fluid therethrough. Expansion means, such as spring 25, is provided to cause slide member 18, as a common actuator member, to move segments 14 and in that manner cause the extendable contact ends of caliper arms 12 to move outwardly from shell 11. Locking means, such as ring member 26, which ring member may have at least one protrusion 27, is provided to lock caliper arms 12 in a retracted position. Caliper arms 12 may be provided with protrusions 28, which protrusions are held by protrusions 27 of ring member 26, whereby caliper arms 12 are locked in a retracted position. Ring member 26 is provided with at least one extension member 29 which extends below the lower end of shell 11. Mechanical resistance means, such as spring 33, is provided to resist upward movement of extension members 29 thereby retaining ring 26 in a locked position. Shell 11 forms a flow tube 34 in its lower portion, which flow tube may be of substantially smaller diameter than the inner diameter of the balance of said shell. Mounted in flow tube 34 is an impeller means, such as propeller 35. Propeller 35 is mounted on a shaft and is adapted so as to be turned by the flow of fluid through flow tube 34. Mounted within shell 11 and sealed from fluid in which the device may be immersed is an electrical generator means, such as generator 36. Generator 36 is adapted so as to be operated by movement of propeller 35. This adaption may be in the form of bevel gears 37 mounted on the propeller shaft of propeller 35 and generator shaft of generator 36. Electrical impulses generated by generator 36 are carried to recorder means by electrical conductors 38. A "Selsyn" self-synchronous device may be satisfactorily utilized to generate electrical impulses in response to the movement of propeller 35. Shell 11 has openings intermediate its ends so as to allow the free passage of fluid therethrough. The upper portion of shell 11 is closed by a fluid tight seal 39.

Figure 2 is a horizontal cross-section taken along line 2—2 of Figure 1, which shows shell 11 having apertures 40 provided therein for the retention of extension members 29. Generator 36 is shown provided in shell 11 and propeller 35 is shown as mounted in flow tube 34.

In Figure 3 the diameter and fluid flow measuring device is diagrammatically shown suspended, within a well bore, from flexible line 41 which passes over pulley 42 and is attached to winding device 43. Caliper arms 12 of the diameter measuring device are shown in extended position, contacting the walls of a well bore. Depth measuring means 44 may also be an electrical impulse generating device which may be attached to winding device 43 and communicates with integrating recorder 45. Recorder 45 may record depth, well bore diameter, velocity of fluid flow, and barrels per hour flow. Recorder 45 may be any conventionally used recorder, such as described in the American Society of Mechanical Engineer Transactions, volume 66, 1944, and as more fully described by Stein et al. in U. S. Patent 2,549,401 (1951). The type preferably used is one in which indicator finger 46 is moved by electrical impulses and continuously records such movement on recorder sheets 47. The electrical impulses from generator 36 and the diameter measuring means are conveyed to winding device 43 through flexible line 41. Depth indicating signals are conveyed to recorder 45 through leads 49. Electrical impulses from the diameter measuring means are conveyed from winding device 43 to integrator 51 and recorder 45 by means of leads 52 and 53, respectively. Electrical impulses from generator 36 are conveyed from winding device 43 to integrator 51 and recorder 45 by means of leads 54 and 55, respectively. Electrical impulses are conveyed from integrator 51 to recorder 45 by means of leads 56.

Well bore and velocity of fluid flow measurements are multiplied or integrated by means of a conventional circuit such as described in U. S. Patent 1,573,850 (1926) by J. M. Naiman. The signals from the diameter measuring means and velocity measuring means vary the resistances in a bridge circuit so that the signal picked off of that bridge circuit corresponds to barrels per hour, which signal is applied to the recorder.

Figure 4 diagrammatically shows slide member 18 which is provided at its one end with an electrical contact 22. Resistance coil 15 completes the circuit between electrical conductors 16 and 17 which are connected to an electrical supply source 48. Electrical conductors 16 and 23 communicate with diameter recorder 45 which completes the circuit 23, 22, 15 and 16. Resistance coil 15 may provide sufficient compensation of resistance to off-set, in the diameter measured, the area covered by shell 11 surrounding flow tube 34. In that manner a true area would be available for the integration of the diameter and fluid flow velocity to record barrels per hour fluid flow. It is obvious that such additional resistance may be provided by a separate resistance coil.

In the operation of the device shown in Figures 1 and 3, the diameter-fluid flow measurement device is suspended from flexible line 41 and is passed downwardly through a bore hole until extension members 29 contact the bottom of the hole. The weight of the measuring device is sufficient to cause members 29 to overcome the resistance of springs 33, forcing ring 26 upwardly releasing the contact between protrusions 27 and 28. Spring 25 then forces slide member 18 downwardly, which rotates gear segments 14 upon pivots 13 causing caliper arms 12 to extend until they contact the walls of the well bore. As member 18 is forced upwardly or downwardly, electrical contact 22 also moves upwardly or downwardly on resistance coil 15 varying the resistance to flow of electrical current therethrough proportional to such movement. The diameter-fluid flow measuring device is then drawn upwardly through the well bore. As the device passes upwardly through the well bore, fluid flowing from or to formations through which the device passes will pass through flow tube 34, rotating propeller 35 which in turn causes generator 36 to generate electrical impulses which pass through line 38 to recorder device 45 recording fluid flow velocity thereon. At the same time caliper arms 12 extend or retract in conformity with the diameter of the well bore thus varying the electrical resistance of coil 15 which in turn varies the recording of diameter on recorder 45. The depth measurement may be taken when the diameter fluid flow measuring device is at the bottom of the well and a continuous recording made of the depth as the device is drawn upwardly while taking continuous diameter and fluid flow velocity recordings. Recorder 45 may include such an integrator as will convert the diameter to cross-sectional area and in turn integrate the area and velocity to record barrels of fluid flow per hour. It is obvious that a transducer such as a circuit breaker may be used instead of generator 36. In such an arrangement a direct current would be passed through the circuit breaker and recorder. The circuit breaker would break the circuit in response to rotation of propeller 35, recorder 45 recording said breaks.

In secondary recovery operations it may be desirable to take a relatively long reading at one point in the well bore. The diameter and fluid flow measuring device may be positioned at a point below the critical formation and a reading may be taken there for any period of time. Reading may then be taken adjacent the critical formation and readings above the formation may be made during another period of time. It will then be possible, upon comparison of the readings, to determine the rate of fluid flow into the formation.

The flow tube enclosed in the lower portion of shell 11 may be of any desired length. For the most accurate data, however, it is advisable to make it of sufficient length that as the contact ends of caliper arms 12 are extended to contact the wall of the well bore they will still remain within or substantially adjacent the horizontal planes passing through the bottom and top of the flow tube.

When fluid flows through a conduit the friction between the fluid and conduit wall causes a reduction in the velocity of fluid flow nearest the conduit wall. As a result fluid flowing with the greatest velocity will be found in the central portion of a conduit. The flow meter of this invention has a distinct advantage over conventional flow meters in that the extending caliper arms keep the flow tube substantially centered in the conduit and measurement is always made of the maximum flow. This gives a more accurate measurement than a meter which might at one time be adjacent the conduit wall and at another time float into the central portion of the conduit.

As will be evident to those skilled in the art, various modifications of this invention can be made or followed in the light of the foregoing disclosure and discussion without departing from the spirit or scope of the disclosure or from the scope of the claims.

We claim:
1. In apparatus of the character described, adapted for simultaneously indicating and recording passage diameter and fluid flow therethrough, the combination comprising a case adapted to be moved through said passage; caliper contact means comprising a plurality of caliper arms pivotally secured, intermediate their ends, and extendable through the sides thereof; electrical variable resistance means operatively connected to said caliper arms and adapted so as to be varied in response to extension and retraction of said arms; recorder means operatively connected to said variable resistance means and adapted to indicate and record movement of said caliper arms, in response to said varied electrical resistance; a flow tube in said case and adapted so as to allow fluid flowing through said passage to flow therethrough; impeller means rotatably disposed in said tube and adapted so as to be actuated by fluid flow through said tube; transducer means operatively connected to and actuated by said impeller means and adapted so as to generate impulses in an electrical circuit proportional to the rate of fluid flow through said flow tube; and an integrator operatively connected to said variable resistance means and said electrical circuit and operatively connected to said recorder.

2. In apparatus of the character described, adapted for indicating and recording well bore diameter and fluid flow therethrough, the combination comprising a case adapted to be moved through said well bore; caliper contact means comprising a plurality of caliper arms pivotally secured to said case, intermediate their ends and extendable through the sides thereof; expansion means within said case adapted so as to force said caliper arms to extend; locking means in the lower portion of said case and adapted so as to lock said caliper arms in retracted position; release means affixed to said locking means and adapted to release said locking means; electrical variable resistance means within said case operatively connected to said caliper arms; recorder means operatively connected to said variable electrical resistance; a flow tube of substantially uniform diameter through its length adapted in said case so as to allow fluid flowing through said passage to flow therethrough; impeller means rotatably mounted and disposed in said tube and adapted so as to be actuated by fluid flow through said tube; generator means operatively connected to said impeller means and adapted so as to generate impulses in an electrical circuit proportional to the rate of fluid flow through said flow tube; and an integrator operatively connected to said variable resistance means and said electrical circuit and operatively connected to said recorder.

3. The apparatus of claim 2 wherein the interior ends of said caliper arms are provided with gear segments, which segments coact with a common toothed slide member, said slide member being adapted so as to vary said electrical resistance by its movement.

4. The apparatus of claim 2 wherein said locking means is a ring member mounted on said case and provided with at least one protrusion adapted to co-operate with protrusions on said caliper arms to retain said arms in fixed positions; and said release means comprises at least one extension member movably secured in and extending through the bottom portion of said case, said extension member being adapted so as to dislodge said ring member from its co-operative relation with said caliper arms upon the application of force to outer end of said extension member.

5. In apparatus of the character described, adapted for simultaneously indicating and recording passage diameter and fluid flow therethrough, the combination comprising a case movable longitudinally through said passage; caliper contact means extendably secured in said case and extendable through the sides of said case; recording means; an integrator; a first electric circuit extending from said recording means and said integrator to said caliper contact means, and to a variable resistance slidably connected to said caliper contact means; a flow tube in said case extending at least a portion of the length therethrough; impeller means rotatably mounted in said flow tube; a second electric circuit extending from said recorder and said integrator; a transducer connected to said second electric circuit and operatively connected to said impeller means; depth measuring means operatively connected to said recorder; and a third electrical circuit connecting said integrator and said recorder.

KENNETH R. MORE.
WALTER G. MIDDLETON, Jr.

References Cited in the file of this patent
UNITED STATES PATENTS

| Number | Name | Date |
|---|---|---|
| 2,102,080 | Kinley | Dec. 14, 1937 |
| 2,333,164 | Fisher | Nov. 2, 1943 |
| 2,334,920 | Gosline et al. | Nov. 23, 1943 |
| 2,340,987 | Robidoux | Feb. 8, 1944 |
| 2,408,012 | Williams | Sept. 24, 1946 |